United States Patent
Tanaka et al.

(10) Patent No.: US 7,136,745 B2
(45) Date of Patent: Nov. 14, 2006

(54) IN-VEHICLE UNIT AND SERVICE CENTER SYSTEM

(75) Inventors: Katsuaki Tanaka, Hitachi (JP); Yoshibumi Fukuda, Kasama (JP); Tadashi Kamiwaki, Naka (JP); Kozo Nakamura, Hitachiota (JP)

(73) Assignees: Hitachi, Ltd., Tokyo (JP); HCX Corporation, Toda (JP)

( * ) Notice: Subject to any disclaimer, the term of this patent is extended or adjusted under 35 U.S.C. 154(b) by 0 days.

(21) Appl. No.: 10/930,779

(22) Filed: Sep. 1, 2004

(65) Prior Publication Data

US 2005/0055154 A1    Mar. 10, 2005

(30) Foreign Application Priority Data

Sep. 4, 2003    (JP) .............................. 2003-312076

(51) Int. Cl.
*G01C 21/14*    (2006.01)
*G01C 21/00*    (2006.01)

(52) U.S. Cl. .................. 701/200; 707/102; 342/357.13

(58) Field of Classification Search ................ 701/200, 701/202, 208, 209, 210; 340/995.14; 707/102, 707/104.1, 200, 100; 342/357.13
See application file for complete search history.

(56) References Cited

U.S. PATENT DOCUMENTS 6,502,033 B1 * 12/2002 Phuyal ....................... 701/214
6,601,073 B1 * 7/2003 Robare ..................... 340/995.1
6,823,255 B1 * 11/2004 Ahrens et al. ............... 701/200
6,950,743 B1 * 9/2005 Kainuma et al. ........... 701/208

FOREIGN PATENT DOCUMENTS

JP    06-099778    4/1994
JP    2000-207219    7/2000

* cited by examiner

Primary Examiner—Dalena Tran
(74) Attorney, Agent, or Firm—Crowell & Moring LLP

(57) ABSTRACT

The object of the invention is to execute a program installed additionally on an in-vehicle unit, realizing improved visual recognition while the vehicle is driving.

A program 7 to be installed additionally is downloaded along with its attribute data 8 from the service center system 10 into the program administrating section 202 of the in-vehicle unit, and they are managed in relation to each other. When the program is executed, the vehicle condition 1 is compared with the attribute data 8 related to the program and the program operation is controlled accordingly.

When executing a program installed additionally on an in-vehicle unit, visual recognition of the display screen can be maintained even while the vehicle is driving.

2 Claims, 14 Drawing Sheets

FIG. 14

| | 1801 |
|---|---|
| REQUEST FOR LAYING OPEN A PROGRAM FOR IN-VEHICLE UNIT ||
| APPLICANT | _____ |
| PROGRAM NAME | _____ |
| FIELD | GAME / CHARACTER / NAVIGATION / BROWSER / TRAFFIC INFORMATION / GEOGRAPHIC INFORMATION / MISCELLANEOUS : _____ |
| OPERATING ENVIRONMENT | OPERATING ENVIRONMENT<br>CPU : _____ MHz OR MORE<br>MEMORY : _____ kB OR MORE<br>SCREEN SIZE : _____ X _____ |
| OPERATING INSTRUCTION | SEE THE ATTACHED FILE |

IN-VEHICLE UNIT AND SERVICE CENTER SYSTEM

CLAIM OF PRIORITY

The present application claims priority from Japanese application serial no. 2003-312076, filed on Sep. 4, 2003, the content of which is hereby incorporated by reference into this application.

FIELD OF THE INVENTION

The present invention relates to an in-vehicle unit such as navigation system, particularly to control of the program that is installed and executed on an in-vehicle unit

BACKGROUND OF THE INVENTION

These days, in-vehicle units that connect with TV tuner and display TV screen and/or connect with mobile phone and provide hands-free phone function in addition to providing navigation function have become popular. For safety, these in-vehicle units are designed to restrict screen display such as TV that draws user's visual attention as disclosed in the Japanese Patent Laid-open No. Hei 06-99778. On the other hand, the Japanese Patent Laid-open No. 2000-207219 discloses an in-vehicle unit on which a program for in-vehicle use is obtained from a center by telecommunication and installed additionally.

SUMMARY OF THE INVENTION

The above conventional in-vehicle unit according to the Publication No. 2000-207219 is capable of installing additional program by downloading and executing the program, but no such control is provided that takes into account whether the added program, if operated while driving, disturbs the operation of the other program being executed at that time or degrades visual recognition of display.

The present invention is made in view of the above, and an object of the invention is to ensure visual recognition in case a program is installed additionally and executed on an in-vehicle unit such as navigation system while driving.

In order to solve the above problem, an in-vehicle unit according to the present invention manages attribute data related to the installed program and controls the program operation by comparing the vehicle condition with the attribute data of the program.

The in-vehicle unit comprises a vehicle data acquiring section that acquires vehicle condition, and a program administrating section that controls the installed additional program in connection with the attribute data of the program including transaction precondition and transaction, and compares the vehicle condition from the vehicle data acquiring section with the transaction precondition in the attribute data and executes the transaction of the program if the vehicle condition meets the transaction precondition or, if it does not, controls the program operation either by holding the program operation or disabling to display the program output.

If an attribute "program off" is set with a precondition "while driving" in the attribute data of the installed program, the program administrating section stops the program running while the vehicle is driving. If an attribute "no transaction" is set in the attribute data of the program, it allows the program to run even while the vehicle is driving.

According to an desirable embodiment of the present invention, when an additional program is installed on an in-vehicle unit such as navigation system and the newly installed program is executed, visual recognition can be ensured even while the vehicle is driving.

BRIEF DESCRIPTION OF THE DRAWINGS

FIG. 14 is a figure showing the "request for laying open a program for in-vehicle unit" data submitted along with a program in case of requesting for laying open the program.

DESCRIPTION OF THE PREFERRED EMBODIMENTS

Embodiments of the present invention are described hereunder.

Figure 2:
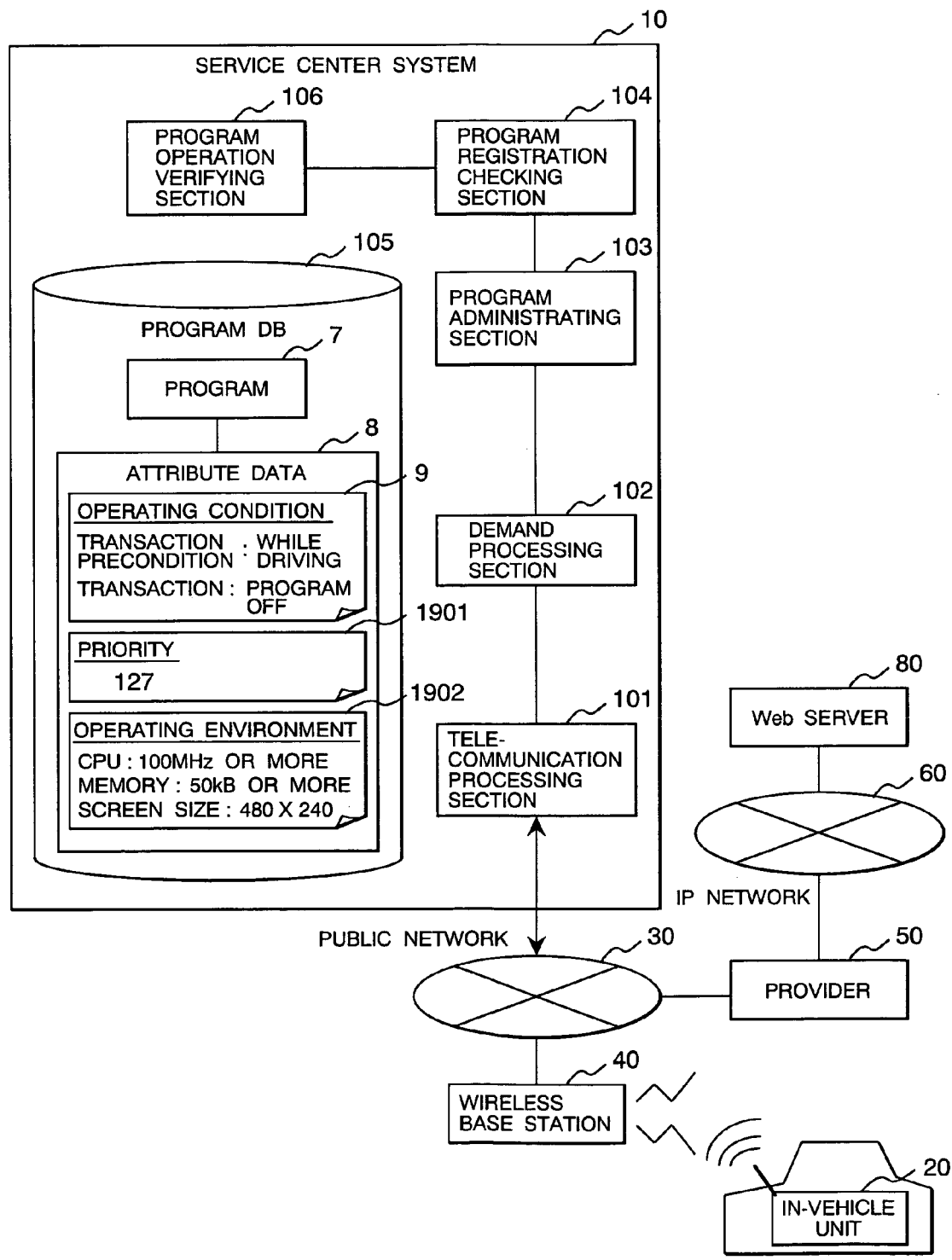
FIG. 2 is a brief block diagram of a program delivery system to which an embodiment of the present invention applies.

FIG. 2 is a brief block diagram of a program delivery system to which an embodiment of the invention applies. The program delivery system comprises an in-vehicle unit 20 and a service center system 10 that provides program to the in-vehicle unit 20, where the in-vehicle unit 20 receives program from the service center system 10 via a wireless base station 40 and public network 30.

The service center system 10 lays open the programs to the in-vehicle unit 20 for additional installation on the in-vehicle unit 20 and, upon request from the in-vehicle unit 20, delivers a laid-open program list and/or program.

The in-vehicle unit 20, which has a built-in wireless unit such as mobile phone or is designed to enable external connection with such unit, can communicate with the service center system 10 via the wireless base station 40 and public network 30. It can also connect with a web server 80 on an IP network 60 through a provider 50 connected with the public network.

Description on the service center system 10 is given below. The telecommunication processing section 101 connects with the in-vehicle unit 10 via the public network 30 and sends and receives data. The demand processing section 102 interprets the data received from the in-vehicle unit 20 by the telecommunication processing section 101 and executes a transaction according to the demand contained in the received data. The program administrating section 103 connects with the program DB105 and acquires a list of programs registered in the program DB105 and searches a program according to the request from the demand processing section 102. The system is also equipped with a function of registering new programs in the DB105 and updating the programs.

Programs 7 for use on an in-vehicle unit 20 are registered in the program DB105, each in connection with its own attribute data 8 that will be delivered along with the program by the service center system 10. The attribute data 8 consists of an operating condition 9, comprising a transaction precondition of the program and a transaction to be executed when the vehicle condition of the in-vehicle unit 20 meets the transaction precondition, priority 1901 showing the display priority among the programs, and operating environment 1902 describing the hardware specification such as memory capacity, CPU performance and screen size. The operating condition 9 is a piece of data consisting of a precondition and a transaction that is executed if the precondition is met while the in-vehicle unit 20 is executing the program 7. For example, if the program 7 is accompanied by an attribute data 8 consisting of a precondition "while driving" and a transaction "program off", the in-vehicle unit is so controlled that the program 7 is held while driving. Attributes as execution precondition include for example "no display while driving" and "no operation while driving". When the attribute "no display while driving" is specified, the program 7 runs, accepts operation and outputs voice but displays nothing. When the attribute "no operation while driving" is specified, the program displays accordingly but the program operation is prohibited.

The program operation verifying section 106 has an environment for operating the program for delivery beforehand and can verify if the program operates under the registered operating condition such as the memory capacity, CPU performance, and screen size of the in-vehicle unit. The program registration checking section 104 can register multiple operating conditions and so can check the operation of multiple in-vehicle units.

The program registration checking section 104 makes the program operation verifying section 106 verify the operation of a program of which registration is requested by the program administrating section 103 and, based on the verification result, judges whether to register the program in the program DB 105. If worth registration, it asks the program administrating section 103 to register the program.

A task at the time when a request for downloading a program 7 is received from the in-vehicle unit 20 in the service center system 10 constructed as above is described hereunder. When the demand processing section 102 receives a request for program download from the in-vehicle unit 20 through the telecommunication processing section 101 via the public network 30, it requests the program administrating section 103 for the specified program 7. When the program administrating section 103 receives the above request, it searches the specified program in the program DB and sends out the program along with the attribute data related to the program to the demand processing section 102. The demand processing section 102 transmits the program and attribute data received from the program administrating section 103 to the in-vehicle unit 20 through the telecommunication processing section 101.

Next, a task at the time when a request for downloading the list of all laid-open programs is received from the in-vehicle unit 20 in the service center system 10 is described hereunder. When the demand processing section 102 receives a request for program list download from the in-vehicle unit 20 through the telecommunication processing section 101 via the public network 30, it requests the program administrating section 103 for a program list. When the program administrating section 103 receives the above request, it collects at least the names, sizes and attribute data of all the programs registered in the program DB 105 and makes a list, and sends it out to the demand processing section 102. The demand processing section 102 transmits the program list received from the program administrating section 103 to the in-vehicle unit 20 through the telecommunication processing section 101.

Figure 12:
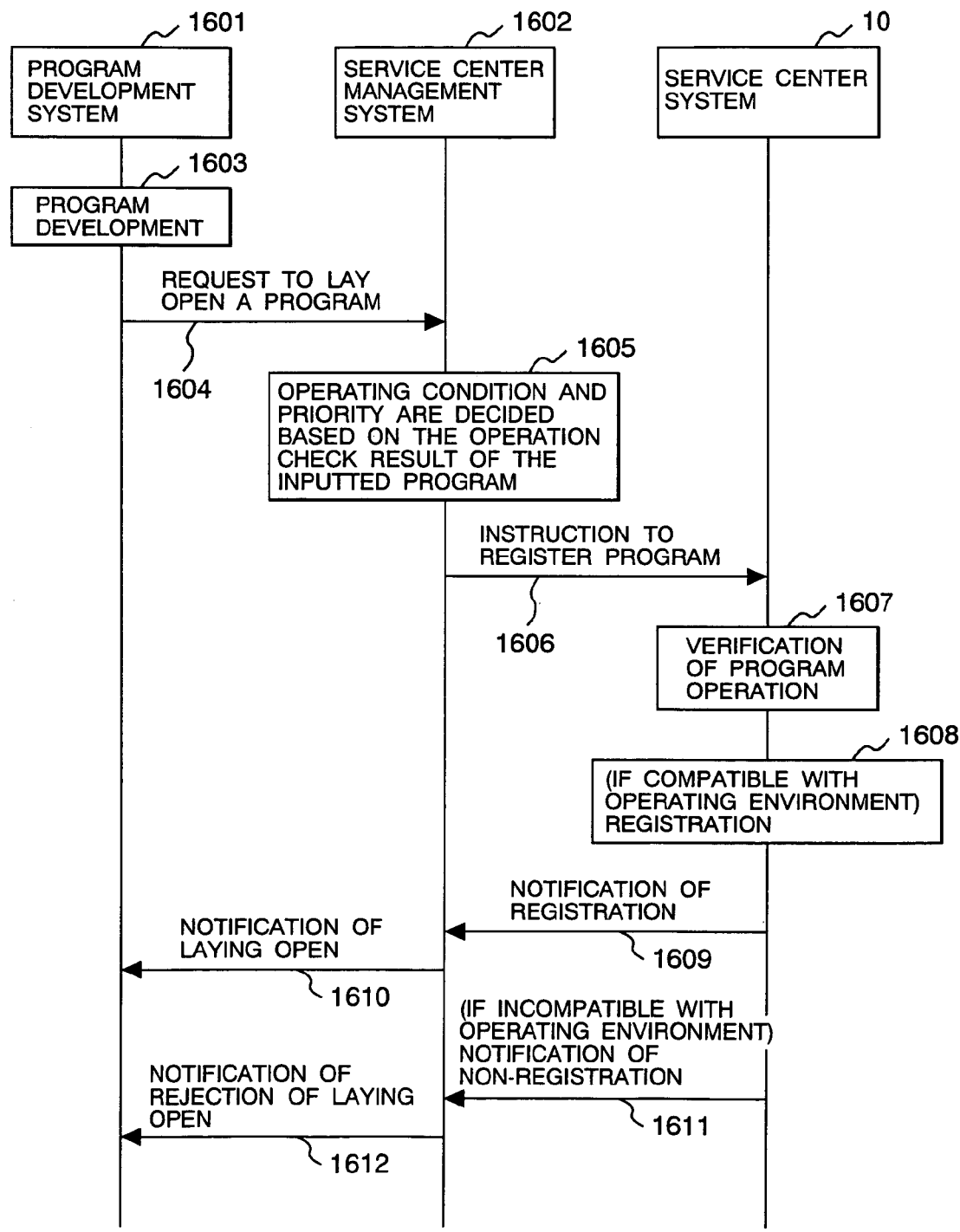
FIG. 12 is a flowchart showing the procedure of laying open a program.

Next, a process flow from the development of a program by a program development system 1601 up to the registration and laying open the program to the in-vehicle unit 20 by the service center system 10 is described hereunder, using FIG. 12. The program development system, after developing a program to be laid open (1603), sends the program and a "request for laying open a program for in-vehicle unit" 1801 along with the program source code to the service center management system 1602, requesting to lay open the program (1604).

The request for laying open a program for in-vehicle unit 1801 contains the name, field, operating environment, and operating instruction of the program to be laid open as shown in FIG. 14. Field of the program is an item such as Entertainment including game, Character, Navigation, Browser, Geographic information, or Traffic information used for classifying the program. This data is used for classified registration of programs so that a desired program can be easily searched when the in-vehicle unit 20 downloads a program, and also used when the service center determines the priority to add to each program. Operating instruction is the data that defines the procedure of using the program, which can be submitted in the form of either an operation manual or an operating procedure definition. If the program to be laid open depends upon a specific machine or applicable hardware of the program is limited, the specification of the applicable hardware shall also be submitted. The specification includes for example the size and resolution of display unit, memory capacity necessary for the program operation, and CPU performance necessary for the operation. The operating environment may further specify use of touch panel and its resolution accuracy, number of available display colors, number of entry keys, and so on.

Next, the service center management system 1602 having received the request for laying open runs the submitted source code of the program to be laid open actually on a simulator of the program operation verifying section 106 to check if the program for delivery can be safely operated while driving, and then decides the operating condition and priority portion of the attribute data (1605) to be added to the program based on the check result. How to decide them will be explained later. When the operating condition and priority to be added to the program are decided, the service center management system 1602 instructs the program registration checking section 104 to register the program and attribute data with the specified priority (1606).

In the program registration checking section 104, upon receipt of the instruction of registration from the service center management system 1602, the program operation verifying section 106 in the service center system 10 verifies the operation of the program (1607). To verify the program operation, the program operation verifying section 106 runs the program under the program operating environment of itself and judges which of the registered multiple operating environments the memory capacity and screen size needed in the above run are compatible with and informs the program administrating section 103 of the result. The program administrating section 103, by relating the compatible operating environment and decided operating condition and priority with the program, registers the program in the program DB 105 (1608). Thus, the program is laid open. When the program has been registered in the program DB 105, the service center system 10 notifies the service center management system 1602 of the completion of registration (1609), and then the service center management system 1602 notifies the program development system 1601 of the commencement of laying open (1610). If no compatible operating environment is available, the program administrating section 103 notifies the service center management system 1602 of non-registration (1611), and the service center management system 1602 notifies the program development system 1601 of the rejection of laying open (1612).

Figure 13A:
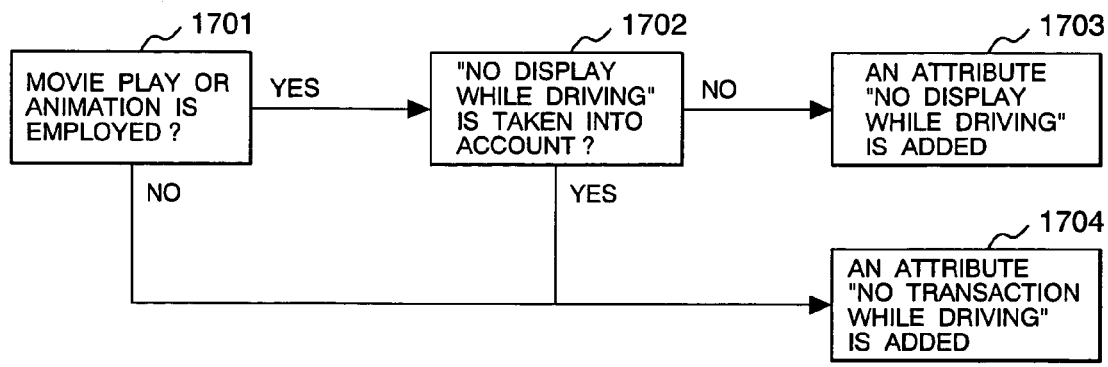
FIG. 13 is a flowchart showing the procedure of deciding the attribute data 8.

Next, how the attribute data is decided (1605) by the service center management system 1602 is described hereunder. To start with, how to decide the operating condition in the attribute data is described, using FIG. 13. The service center management system 1602 runs the program on the simulator in accordance with the submitted operating instruction so as to check if necessary safety is taken into account in operating the program while driving and if the program is structured in accordance with a predetermined guideline, and decides the operating condition. In FIG. 13A, whether API (Application Program Interface) is read out is checked to see if movie play or animation is employed (1701). If any is employed, whether the program has a step to execute a routine of disabling the display while driving is checked (1702). If none, an attribute "no display wile driving" is added to the program (1703) because displaying on the screen while driving may draw visual attention. If neither movie play nor animation is employed or if a step of disabling the display while driving is taken, an attribute "no transaction while driving" is added (1704) and no restriction is given to the operation because safety measures have been taken into account.

Figure 13B:
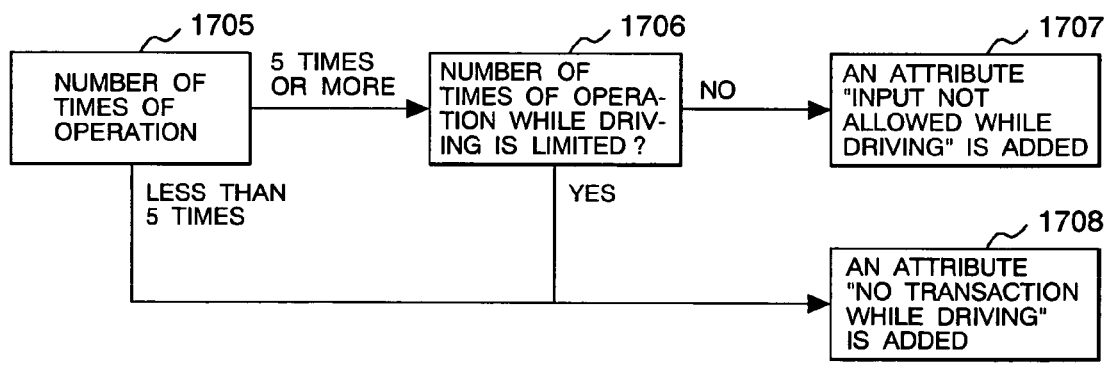

Furthermore, in FIG. 13B, the maximum number of times of operation for calling the function provided by the program is checked by measuring the number of times of execution of the routine the accepts user input (1702). If the number of times of operation is 5 or more, whether the number of times of operation is limited while driving is checked (1706). If not limited, an attribute "no transaction while driving" is added because the operation of the program while driving takes too much time (1707). If the number of times of operation is less than 5 or is limited while driving, an attribute "no transaction while driving" is added (1708).

Figure 13C:
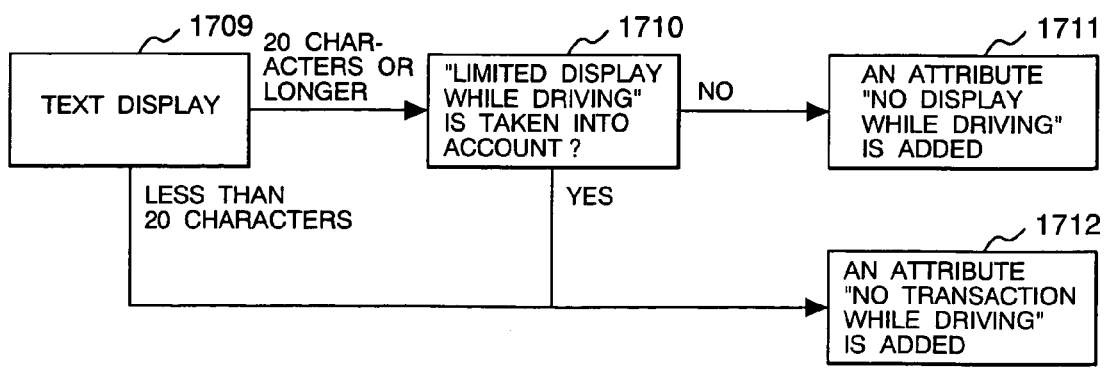

Furthermore, in FIG. 13C, whether the program displays a long text that may draw visual attention is checked by examining the length of the character string data to be processed in a character string display routine (1709). If a text of 20 characters or more is to be displayed on the screen by the display routine, whether the display of the text is limited while driving is checked (1710). If not limited, an attribute of "no display while driving" is added because the program may draw visual attention while driving (1711). If the text to be displayed contains less than 20 characters or the maximum number of characters to be displayed while driving is limited, an attribute "no transaction while driving" is added (1712).

The check items explained above are just example and the service center management system can add necessary check items for the operation of the service center system 10. In addition, the judgment on each check item can be made in such a manner that the examiner runs the program to be checked on the simulator, checks the result visually, and enters the check result from a terminal. If this applies, the input items into the service center management system are just the result of each judgment flow shown in FIG. 13, including whether an attribute "no display while driving" should be added or not, whether "no transaction while driving" should be added or not, and so on.

Next, how to decide the priority in the attribute data is described. The service center management system 1602 decides the priority of each program based on the field data received from the program development system 1601 along with the request for program registration. For example, of the Navigation and Character fields, Navigation is given a higher priority because of its relatively higher needs for real-time operation. On the other hand, a program for displaying requested location-related information or displaying real-time Traffic information needs to be given a higher priority than Navigation display. A field such as Game is given a lower priority than Navigation display because of its lower necessity for operation while driving.

The priority decided as above based on the field of each program may be corrected in accordance with the aforementioned check result of the operating condition. For example, a program added with an attribute "no transaction while driving" is given a higher priority because it hardly disturbs the Navigation display and, on the contrary, a program added with an attribute "no display while driving" is given a lower priority. For the same reason, a program is added with an attribute "input not allowed while driving" is given a lower priority so that it does not disturb the display by other program. The range of priority for correction may be varied by a combination of the attribute to be added and field of the program. The relationship between them will then be defined as a table of priority correction factor (not shown).

The decision making processes of the operating condition and priority on the simulator in the service center management system 1602 can be done in the service center system 10. If this applies, the decision on the operating condition made on the simulator in the service center management system 1602 is made on the simulator in the program registration checking section 104 according to the simulation result in the program operation verifying section. Similarly, the decision on the priority is made in the program registration checking section 104.

Figure 3:
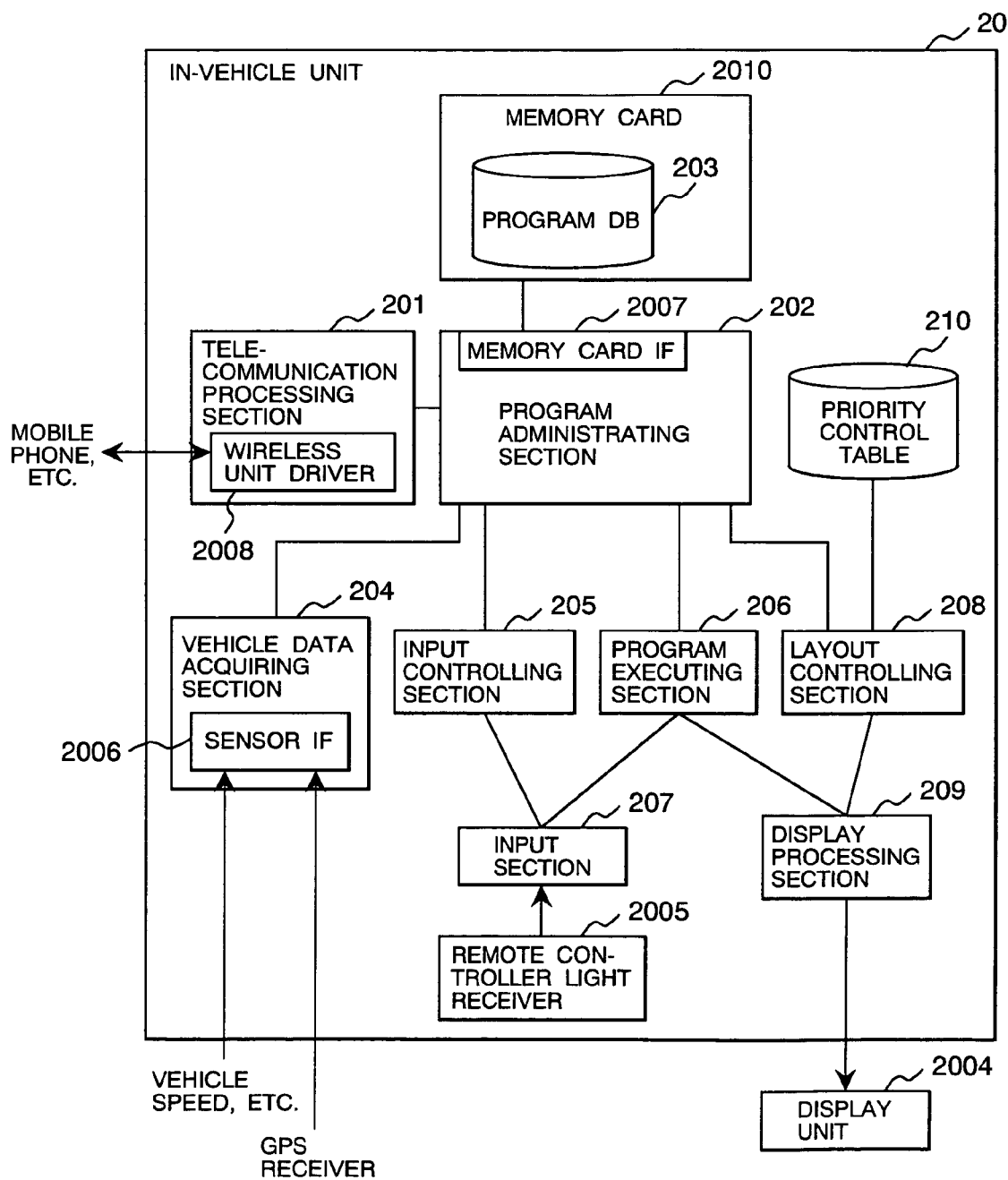
FIG. 3 is a functional block diagram of the in-vehicle unit 20.

Description on the in-vehicle unit 20 is given hereunder. FIG. 3 is a functional block diagram of the in-vehicle unit 20. The telecommunication processing section 201 connects with the service center system 10 via the public network 30 and wireless base station 40, and transmits/receives data. The program DB 203 stores the programs 7 to be operated on the in-vehicle unit 20, their attribute data 8, and the operating state of each program such as active or inactive at the last switching off of the in-vehicle unit 20 in relation to each other.

Figure 1:
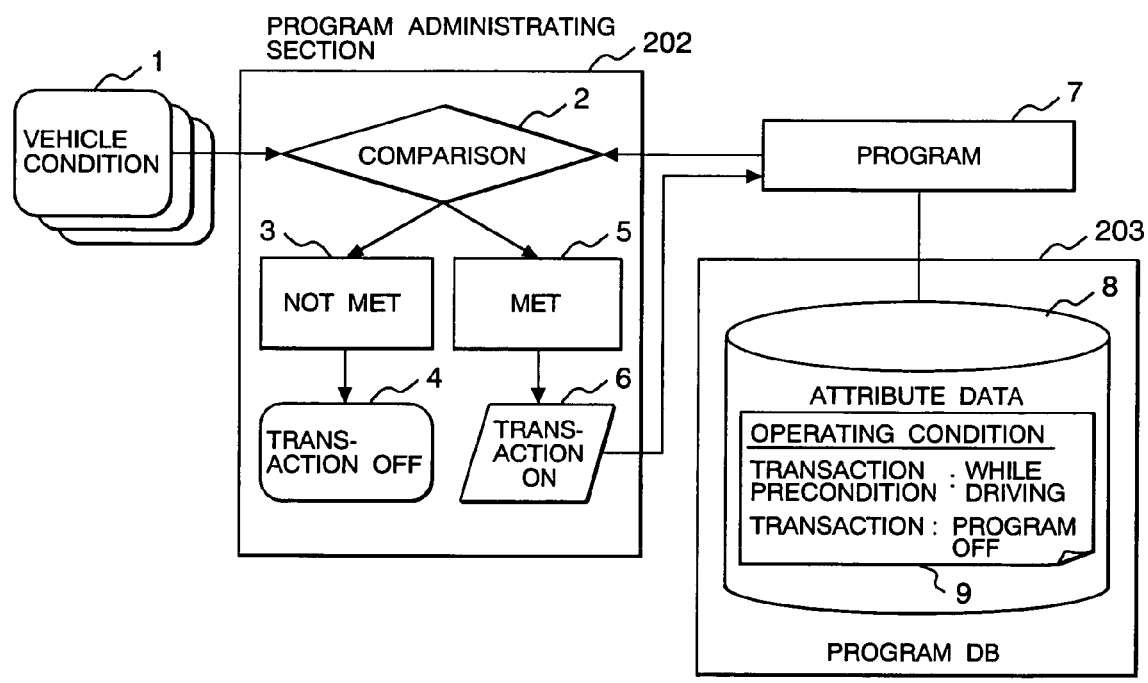
FIG. 1 is a block diagram showing the program administrating section 202 in FIG. 3.

The program administrating section 202 has a function of connecting with the program DB 203, acquiring the registered program list from the program DB 203, searching a program, registering a new program in the program DB 203 and deleting a program from it, and, upon switching on the in-vehicle unit, acquiring from the program DB 203 the operating state of the programs upon the last termination so as to run the then-active programs in the program executing section 206 and resume the operating state upon the last termination. For registration of a new program, the program administrating section 202 checks whether the operating environment of the in-vehicle unit 20 is compatible with that contained in the attribute data of the program and, if compatible, registers the program in the program DB 203. If not compatible, it does not register the program in the program DB 203 but displays an unsuccessful registration message on a display unit 2004 to notify the user of it. In addition, as shown in FIG. 1, the program administrating section 202 monitors the change in the vehicle condition 1 acquired by the vehicle data acquiring section 204 and, if for example it detects the vehicle has started driving, it compares the change with the operating condition 9 related to the program 7 in operation (2) and controls the operation of the program 7 by executing a transaction "program off" (6), which is the transaction related to the transaction precondition 9, for the program that meets the transaction precondition "while driving" (5). If the attribute data 8 does not meet the vehicle condition upon comparison (3), no transaction is executed (4).

If the operating condition 9 is "while driving" and "input not allowed" when the program administrating section 202 detects the vehicle has started driving, the program administrating section 202 sends a request for not allowing input into the program to the input controlling section (which will be explained later) so as to prohibit entry. If the operating condition 9 is "while driving" and "no display" when the program administrating section 202 detects the vehicle has started driving, the program administrating section 202 sends a request for not displaying the program operation to the layout controlling section (which will be explained later) so as to prohibit display.

Figure 4:
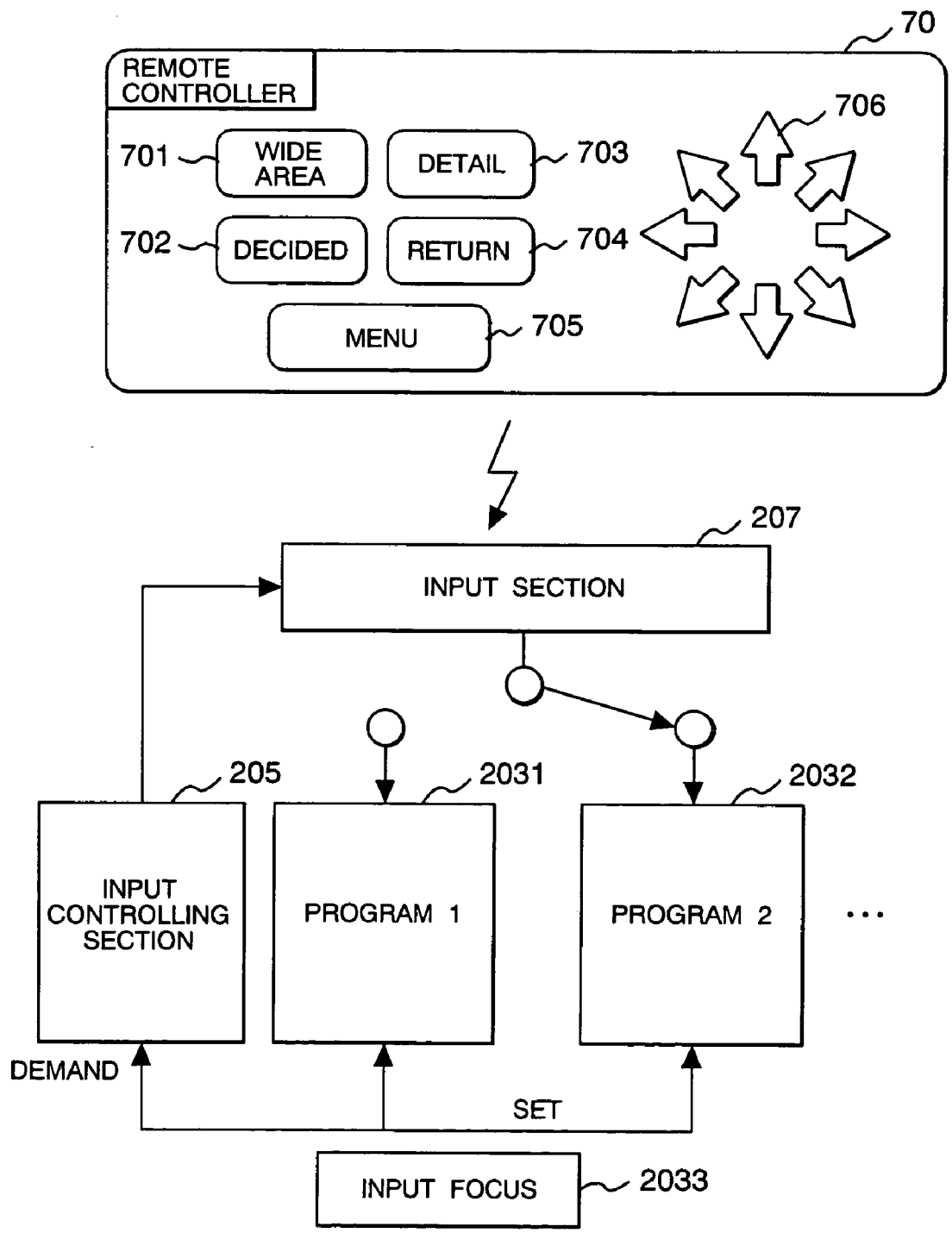
FIG. 4 is a diagram showing the processing in the input controlling section 205.

Next, the description on the input controlling section 205 and input section 207 is given hereunder, using FIG. 4. The input section 207 detects an input event, generated by the user's remote controller 70 operation, via the remote controller light receiver 2005. In this embodiment, an input device like the remote controller 70 comprising a "Wide area" button 701, "Detail" button 703, "Decided" button 702, "Return" button 704, "Menu" button 705, and direction button 706 is used.

The input controlling section 205 controls which of the multiple programs currently in operation, program 1 (2031) and program 2 (2032), is the one that can accept input data from the input section because an input focus 2033 has been set. The input section 207 is informed of the program to which the input focus 2033 has been set (program 2 (2032) in the figure) by the input controlling section 205 and sends the event to the program, thus being capable of selecting a program to operate among the multiple programs in simultaneous operation. The allocation of the input focus 2033 can be switched by sending a request to the input controlling section 205. If a request for prohibiting sending an input event of a program is received from the program controlling section, the program is excluded from those for the input focus. With this exclusion, any user operation of the program accompanied by an operating condition "operation not allowed while driving" can be prohibited.

Figure 5:
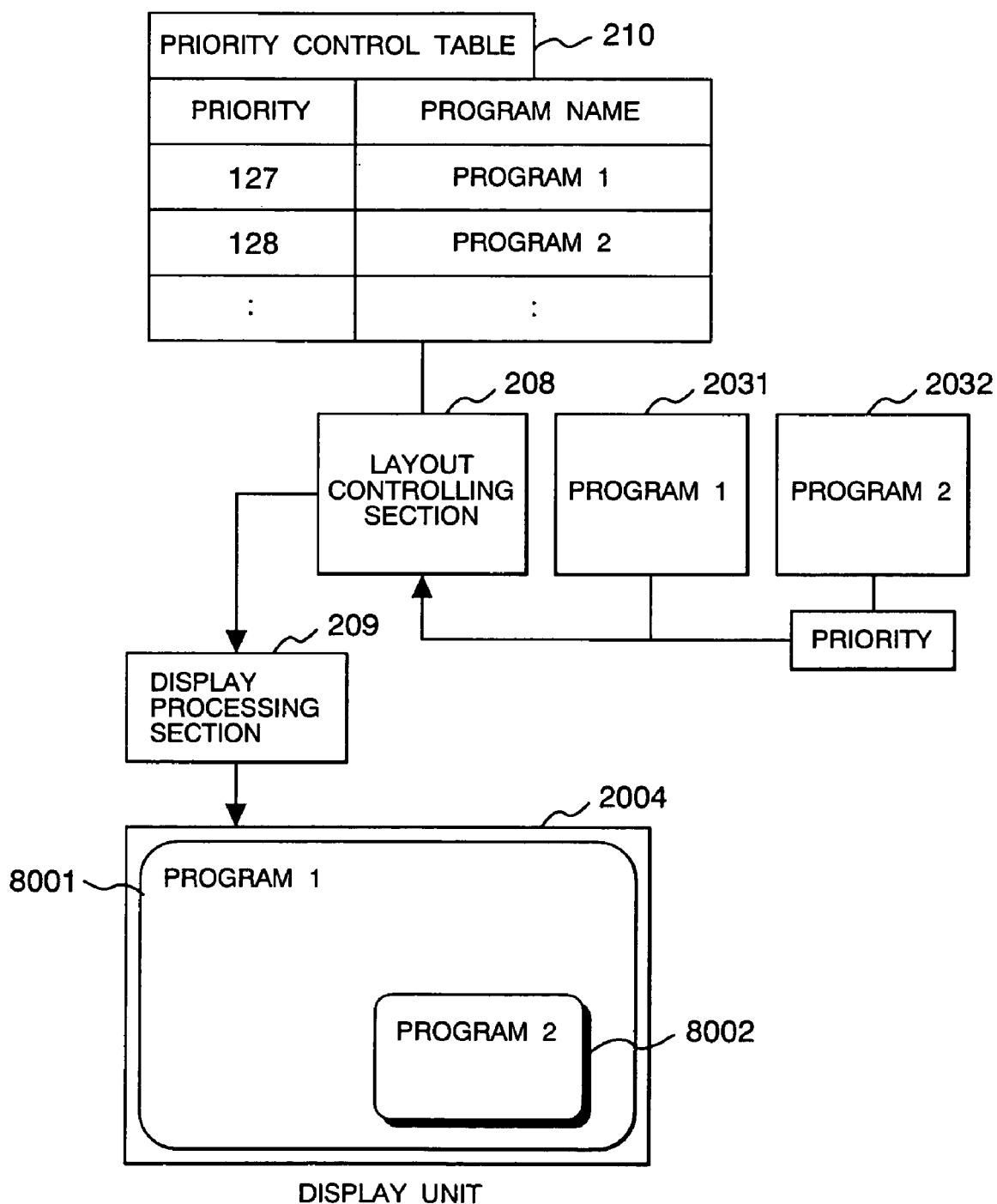
FIG. 5 is a diagram showing the processing in the layout controlling section 208.

Next, the description of the layout controlling section 208, priority control table 210, and display processing section 209 is given hereunder, using FIG. 5. The layout controlling section 208 controls the screen layout and displays data on the display unit 2004 such as a LCD panel via the display processing section 209, by referring to the priority control table 210 and calling one screen graphic function after another of the program currently operated by the program executing section 206 based on the priority registered in the priority control table 210. When a new program is registered, the program controlling section 202 acquires the priority contained in the attribute data 8 and registered it in connection with the program name into the priority control tables 210. This explanation is based on an assumption that the priority is contained in the attribute data 8. If it is embedded in a program, however, the priority is acquired from the program and registered in connection with the program name.

In this embodiment, simultaneous display by multiple programs on the same single display unit (2004) is made available by means of such a control that data of a program with high priority is displayed on a more fore plane of the screen than a program with relatively low priority. In this embodiment, a greater number means a greater priority: in FIG. 5 for example, when the program 1 (2031) with the priority 127 and the program 2 (2032) with the priority 128 are in operation, the display area (8002) of the program 2 with relatively higher priority is displayed as superimposed on the fore plane of the display area (8001) of the program 1 on the display unit 2004. If the layout controlling section 208 receives a request for not displaying a program operation from the program administrating section 202, it prohibits display by not calling the graphic processing routine of the program.

The in-vehicle unit 20 is equipped with a memory card IF (interface) 2007 for connection with a memory card 2010, sensor IF 2006 for connection with various in-vehicle sensors and GPS receiver, remote controller light receiver 2005 for receiving an remote controller input, and wireless unit driver 2008 for controlling wireless units such as mobile phone. The programs constituting the in-vehicle unit 20 can be read from ROM or a memory card 2010 connected with the memory card IF 2007 and then executed. Otherwise, those can be downloaded from the service center system 10 on the public network 30 or Web server 80 on the IP network 60 and then executed.

Figure 6A:
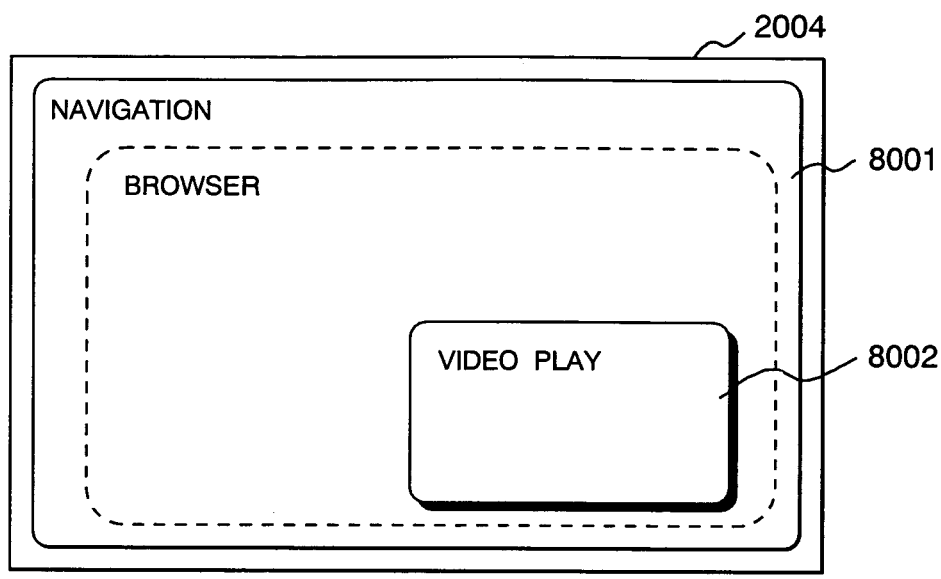
FIG. 6 is a example of display screen on the in-vehicle unit 20, showing the program control menu 8003.

Next, the operation of the in-vehicle unit is described hereunder. FIG. 6A shows the display unit 2004 on an occasion three programs, Navigation, Video play, and Browser are in operation. It is assumed that the priorities of the three programs are Video play> Navigation> Browser and that Navigation is displayed on the display area 8001, Video play is displayed on the display area 8002, and Browser of which priority is relatively lower than Navigation is not displayed but hidden behind the Navigation display area 8001. If the user presses the "Menu" button 705 on the remote controller 70 on this occasion, the input section 207 judges the signal received at the remote controller light receiver 2005 and a corresponding menu display command is sent to a menu display program.

The menu display program is one-of the programs executed by the program executing section 206 but an important program for user interface of the in-vehicle unit 20, and so it is treated specially and differently from other application programs. Accordingly, irrespective of the control on the input focus by the input controlling section 205, specific commands to the program are always acceptable. The menu display program is normally not displayed but set ready for entry, and it is displayed when a menu display command is received. Since the priority of the menu display program is set higher than any other program, it is displayed on the most fore plane by the layout controlling section 208 and accordingly the screen changes to the one in FIG. 6B, where the program control menu 8003 is displayed on the upper area of the display unit 2004.

Figure 6B:
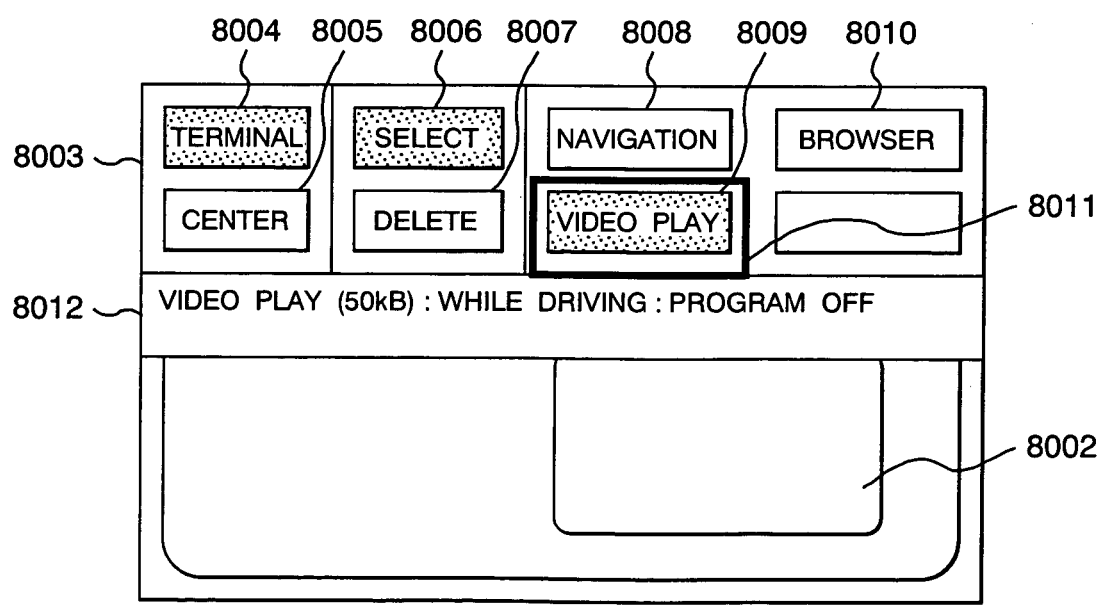

The program control menu 8003 comprises the soft buttons 8004 to 8010 and button focus 8011. The button focus 8011 receives an input signal that is sent according as the user's "Direction" button 706 operation on the remote controller 70, interprets the signal on the program control menu 8003 and moves its position, and then, sets a soft button to a selected mode upon an input that is sent according as the user's "Decided" button 702 operation. In FIG. 6B, the soft buttons 8004, 8006 and 8009 are in a selected mode. The "Terminal" soft button 8004 and "Center" soft button 8005 on the left most constitute a pair of radio buttons, either one of which can be selected at one time. The "Terminal" soft button 8004 indicates that the program control menu 8003 is in the mode of controlling the programs registered in the program DB 203 of the in-vehicle unit 20. If the "Terminal" soft button 8004 is in a selected mode, radio buttons consisting of the "Select" soft button 8006 and "Delete" soft button 8007 are displayed on the second row from the left, either one of which can be selected at one time. The "Select" soft button 8006 is for instructing to switch the focus of the program and the "Delete" soft button 8007 is for instructing to delete a program registered in the program DB 203 of the in-vehicle unit 20.

On the soft buttons 8008 to 8010, program names registered in the program DB 203 are displayed. In FIG. 6B, where for example the "Terminal" soft button 8004 and "Select" soft button 8005 are in a selected mode, if an input signal for moving the button focus 8011 onto the "Video play" soft button 8009 is received, the menu display program acquires the name, size and attribute data 8 of the programs concerning video play from the program administrating section 202 and displays them on the status bar 8012. If the "Decided" button 702 is pressed on this occasion, the menu display program returns back to a not-displayed mode and consequently the program control menu 8003 and status bar 8012 disappear. Instead, the input focus set on the menu display program is switched onto the selected video play program by the input controlling section 205, and the operation by the remote controller 70 is now possible.

Under the condition shown in FIG. 6B, if the "Delete" button 8007 is set to a selected mode and the "Decided" button 702 is pressed, an instruction for deleting the selected video play program is sent from the menu display program to the program administrating section 202. According to this instruction, the program administrating section 202 deletes the video play program from the program DB 203 and returns a delete complete response to the menu display program. Upon receipt of this response, the menu display program deletes the program name from the "Video play" soft button 8009.

Figure 7A:
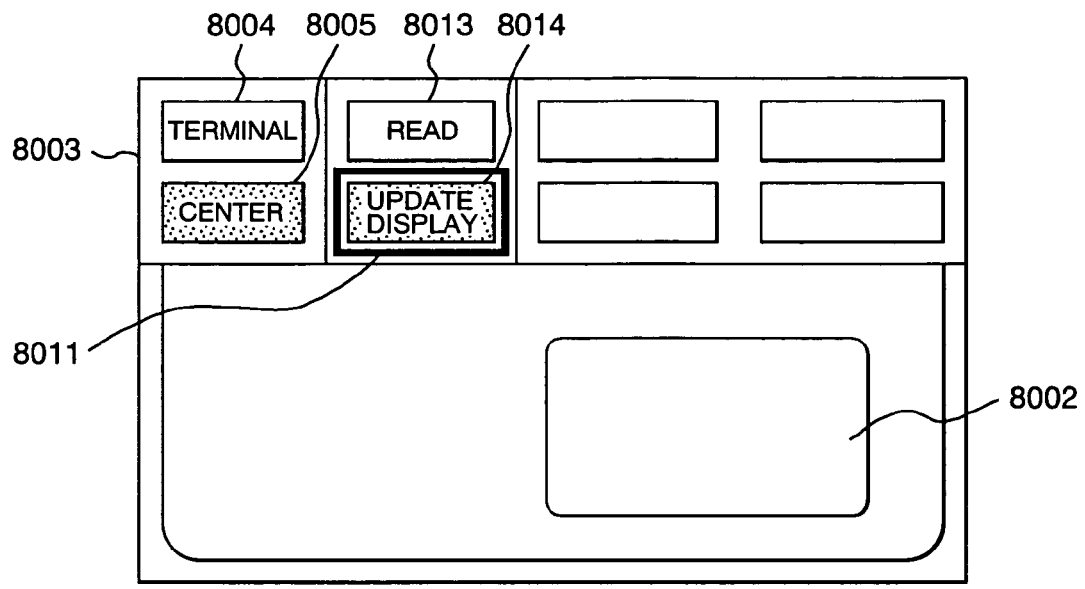
FIG. 7 is a example of display screen on the in-vehicle unit 20, showing the operation on the program control menu 8003.
Figure 7B:
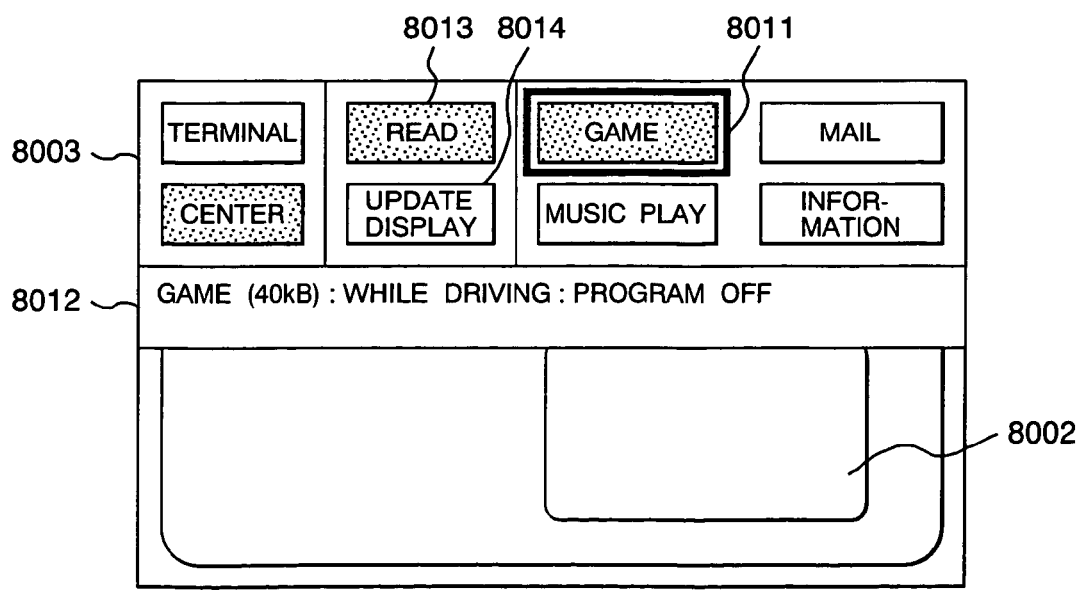
Figure 8A:
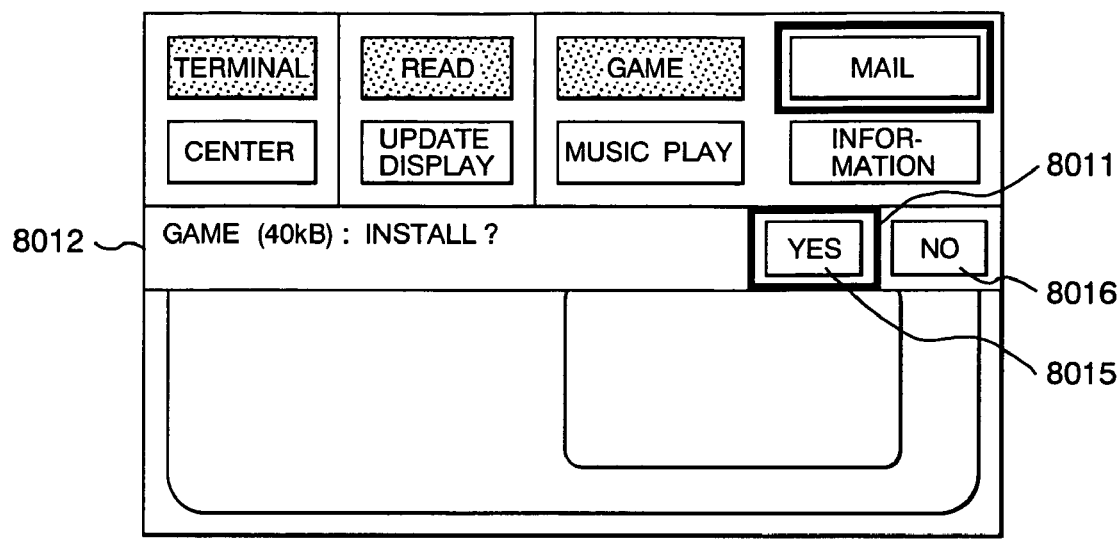
FIG. 8 is a example of display screen on the in-vehicle unit 20, showing the operation for installing a program.
Figure 8B:
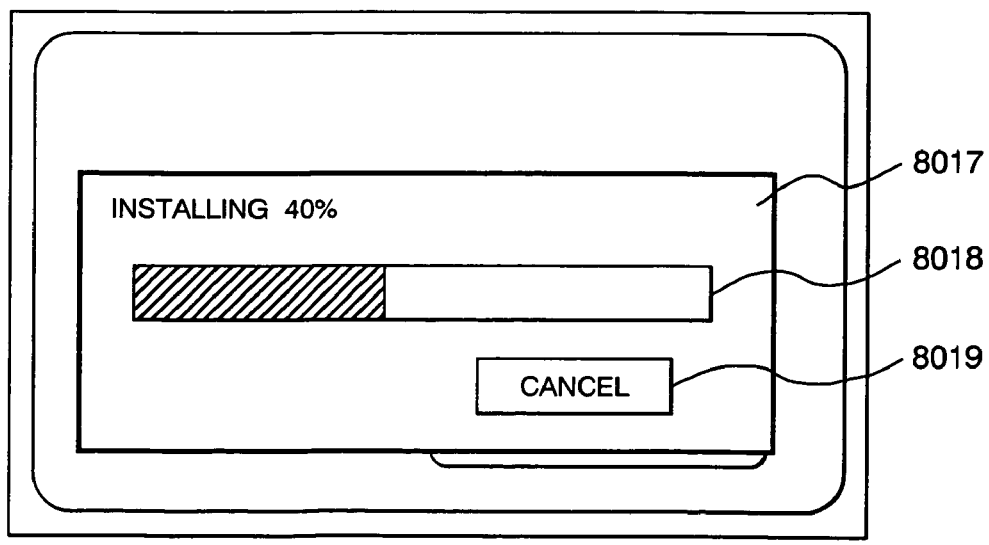

Next, the operation needed to acquire a list of programs laid open on the service center system 10 and to install a new program using the program control menu 8003 is described hereunder, using FIG. 7 to FIG. 9.

In FIG. 7A, the "Center" soft button 8005 is in a selected mode on the program control menu 8003. Under this condition, the soft buttons on the second row from the left are the radio buttons consisting of the "Read" soft button 8013 and "Update display" soft button 8014, each of which enables reading and installing a program laid open on the service center system 10 and displaying a list of all the laid-open programs, respectively.

On an example in FIG. 7A, the "Update display" soft button 8014 is in a selected mode. If the "Decided" button 702 is pressed on this occasion, the menu display program requests the program administrating section 202 to acquire a list of all the laid-open programs. Upon receipt of this request, the program administrating section 202 connects with the service center system 10 through the telecommunication processing section 201, acquires the list of laid-open programs from the service center system 10, and sends it back to the menu display program. The menu display program displays the laid-open program names out of the list of laid-open programs on the soft buttons at the third and fourth rows from the left on the program control menu 8003 and also displays the program name, size and attribute data 8 of the program on which the button focus 8011 is positioned. Thus, the screen changes to the one in FIG. 7B.

On this screen, the "Read" soft button 8013 is made selectable by an input signal from the input section, and then, if an input for moving the button focus 8011 is received, one of the laid-open programs is about to be selected. If an input signal of the "Decided" button 702 is received, the menu display program displays an installation confirmation message along with a "Yes" soft button 8015 and "No" soft button 8016 as shown in FIG. 8A. On this occasion, if a necessary operation signal is received and the button focus 8011 is moved onto the "Yes" soft button, and then an input signal of the "Decided" button is received, the menu display program sends the program and associated data to be installed to the program administrating section 202 and instructs it to start installation, and at the same time, displays a message window 8017 evidencing that the installation is under way on the screen and also displays a graph 8018 showing the progress of installation and a "Cancel" soft button 8019 for accepting the cancellation of installation in the above message window 8017

Upon receipt of the request for installing a program, the program administrating section 202 requests the service center system through the telecommunication processing section 201 to download the program based on the program and associated data sent from the menu display program. Then, the downloaded program is registered in the program DB and the installation is now complete. If the button focus is moved onto the "Cancel" soft button 8019 in the message window 8017 and an input is received by pressing the "Decided" button 702, an instruction for canceling the installation is sent from the menu control program and accordingly downloading can be terminated and installation can be cancelled.

Figure 9A:
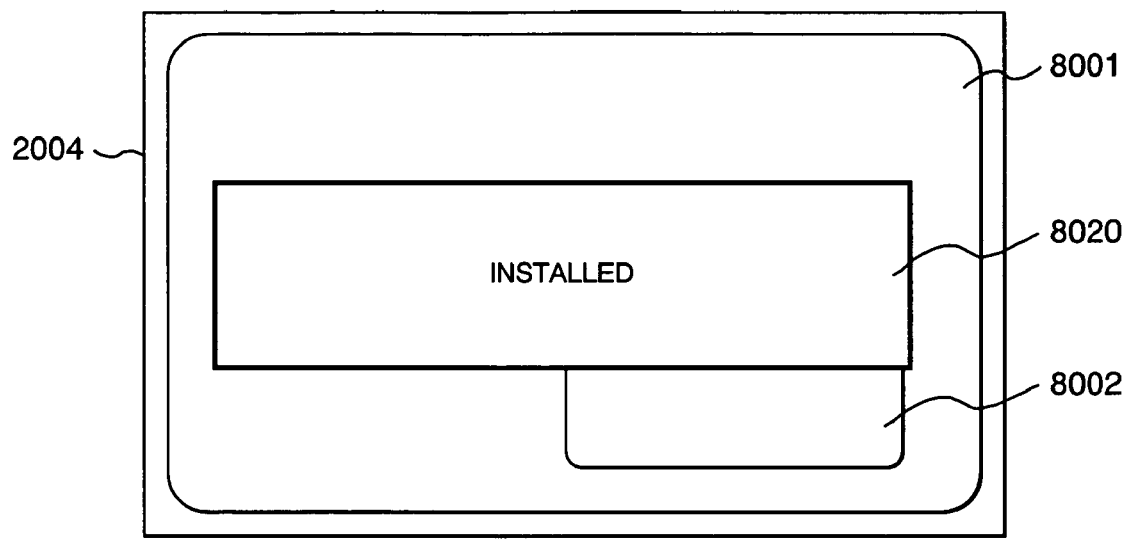
FIG. 9 is a example of display screen on the in-vehicle unit 20, showing the program control menu 8003 after the completion of program installation.
Figure 9B:
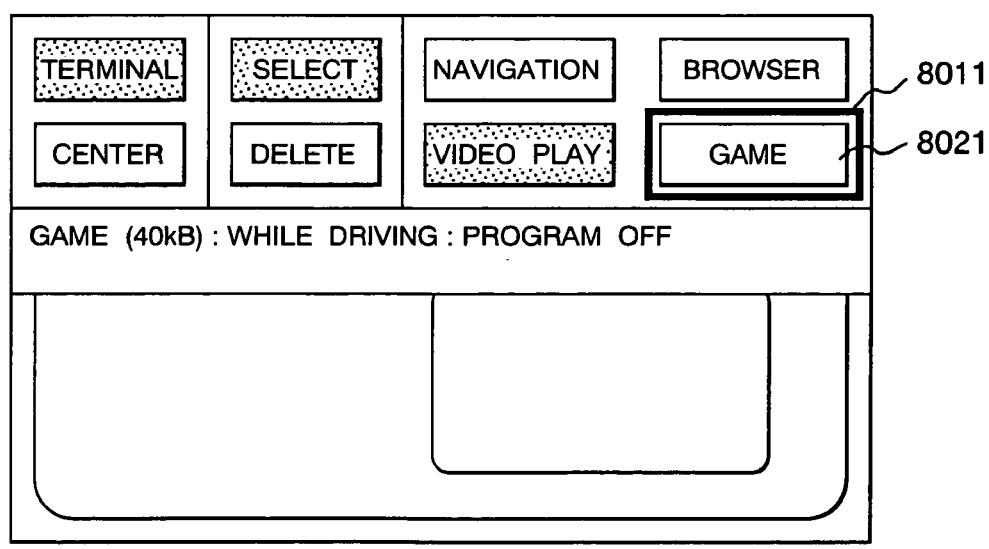

Upon receipt of a notice of complete installation from the program administrating section 202, the menu display program displays an "Installed" message window 8020 on the display unit 2004 as shown in FIG. 9A. In addition, the program administrating section 202 registers the downloaded program and related attribute data 8 in the program DB 203 and the menu display program adds a soft button 8021 for the added program name to the program control menu 8003 based on this registered data. Thus, the screen changes to the one in FIG. 9B.

Next, the operation needed to install a program that has been laid open by others than the service center system 10 on the Web server 80 connected with the IP network 60 is described hereunder. For this installation, the program is downloaded from the Web server 80 using a Web browser and then the downloaded program is installed on the in-vehicle unit. In this installation, the other party of the telecommunication by the telecommunication processing section 201 is a Web server 80 instead of the afore-mentioned service center system, and the operation itself for installing a program is the same.

Figure 10A:
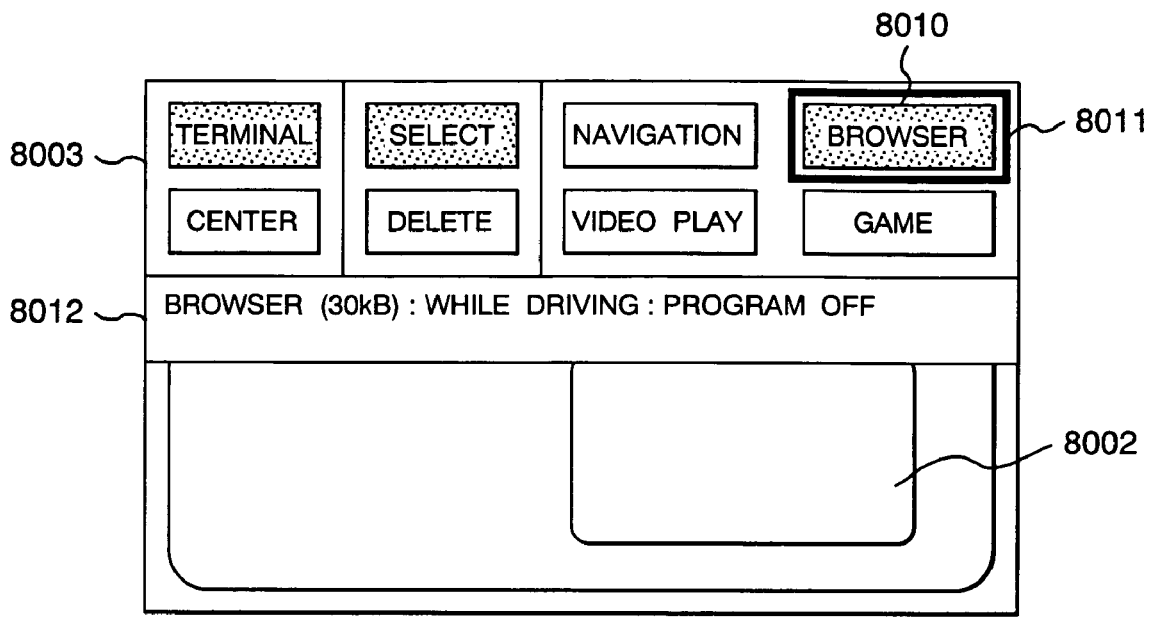
FIG. 10 is a example of display screen on the in-vehicle unit 20, showing a browser screen for installing a program.
Figure 10B:
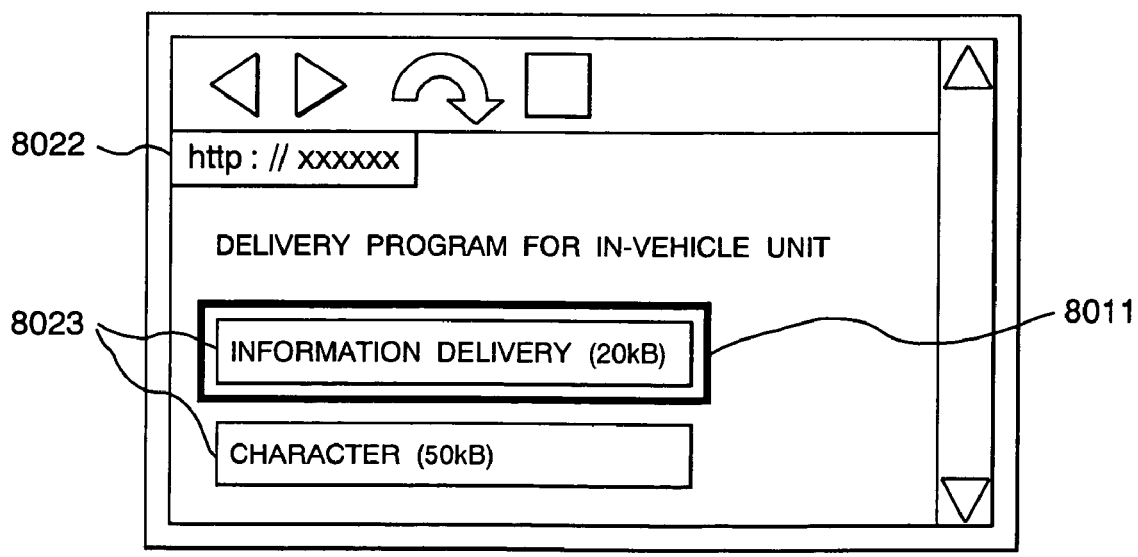

When the "Browser" soft button 8010 is selected using the button focus 8011 and the "Decided" button 702 is pressed as shown in FIG. 10A, the screen changes to the one in FIG. 10B showing the Web browser. Under this condition where the URL of a web site that lays open the program on the Web server 80 has been inputted from a soft keyboard (not shown) on the URL indication column 8022, if the "Decided" button 702 for accepting the selected input is pressed, the browser acquires an HTML format file from the above URL and displays a list of URL links of the laid-open programs as shown on 8023. Then, if a selection signal by the "Decided" button 702 is inputted to the browser after a desired program to be added has been selected by an input signal from the button focus 8011 operation, the browser starts downloading the program via the program administrating section and telecommunication processing section. When the program download is complete, the service center system 10 carries out the same steps for program installation in and after FIG. 9A and instructs the program administrating section to register the program in the program DB. Thus, the new program is added.

Since no attribute data 8 is added to any program that is laid open by others than the service center system 10 and so whether the program is suitable for the use while driving cannot be judged. Because of the above reason, any program downloaded from others than the service center system 10 is added with an operating condition 9 "while driving: program off" and then registered in the program DB 203 so as to prohibit display and operation while the vehicle is driving.

Figure 11:
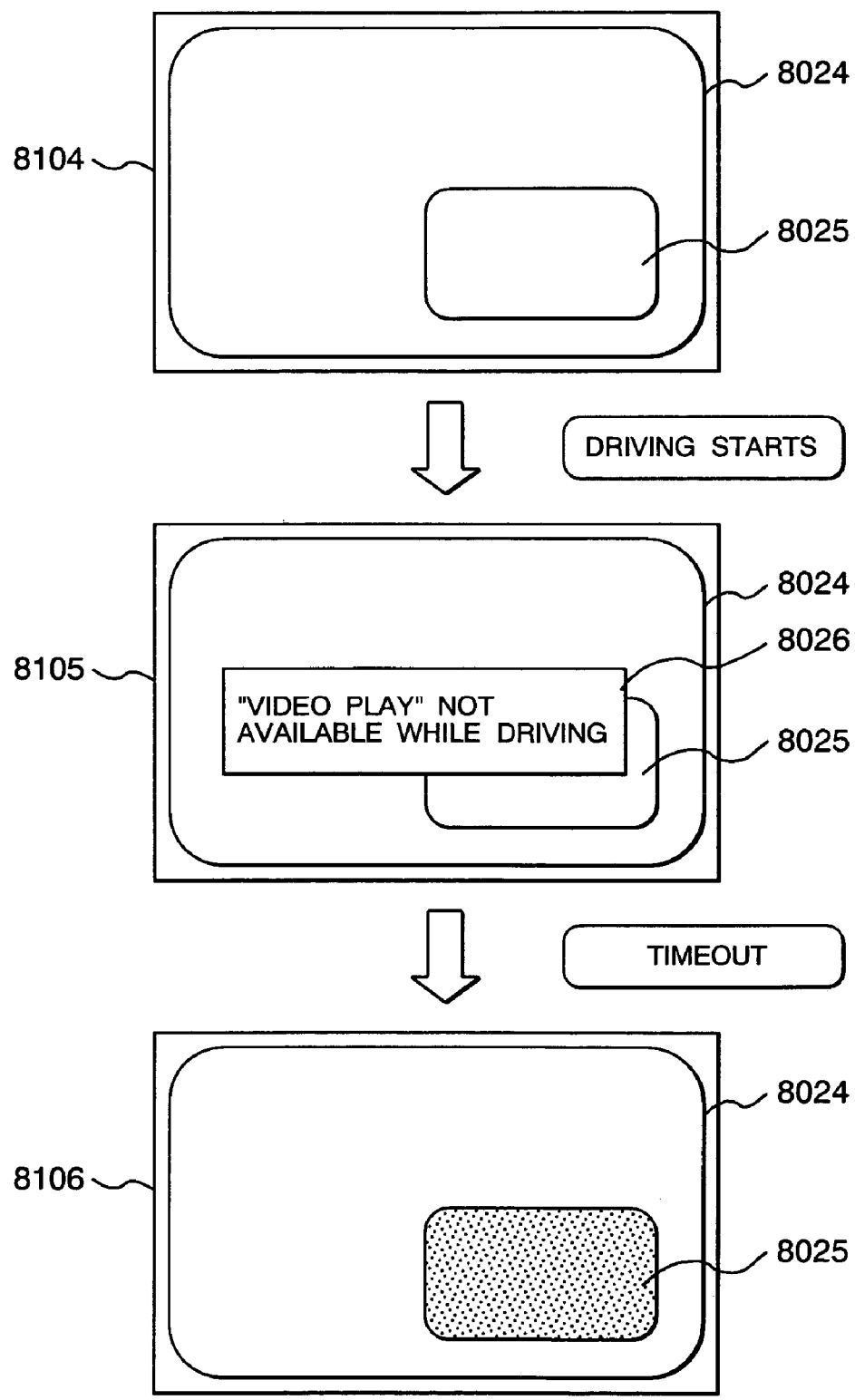
FIG. 11 is a example of display screen on the in-vehicle unit 20, showing the change of screen at the time when the vehicle starts driving.

Next, the description hereunder covers how the screen display changes if the vehicle starts driving in case a program accompanied by an attribute data 8 containing an operating condition 9 "while driving: program off" is being operated, using FIG. 11.

On the screen 8104 of the display unit 2004, there is a display area (8024) of a program accompanied by an operating condition "no transaction while driving" and another display area (8025) of a video play program accompanied by an operating condition "while driving: program off". While each program is given a corrected priority based on the operating condition, it is assumed that a program to be displayed on the display area (8025) for video play program accompanied by an operating condition "while driving: program off" is given a higher priority decided on the basis of the field of program. If the vehicle starts driving under the above condition, the program administrating section 202 detects the vehicle condition acquired by the vehicle data acquiring section 204, terminates the video play program 8023, and displays a message 8024 indicating that "Video play" is not available while the vehicle is driving as shown on the display screen 8105. Then, after a specified time has elapsed to timeout, the program administrating section 202 instructs the layout controlling section 208 to shade the display area 8025 of the video play program as shown on the screen 8106. Although the display area of the terminated program is shaded in this embodiment, it is permissible to control to delete the display from the screen.

What is claimed is:

1. An in-vehicle unit in which program for in-vehicle use is to be installed, comprising:
   a vehicle data acquiring section that acquires vehicle condition; and
   a program administrating section that controls the program in connection with an attribute data of the program at least including transaction precondition and transaction, and if the program to be installed has no attribute data, registers the program by adding the attribute data for disabling the operation while the vehicle is driving, and upon executing the program, compares the vehicle condition from the vehicle data acquiring section with the transaction precondition in the attribute data and executes the transaction in the attribute data when the precondition is met.

2. A service center system that provides a program for in-vehicle use upon receipt of a download request from an in-vehicle unit, comprising:
   a program database that stores programs for in-vehicle use, together with an associated attribute data which includes at least a precondition regarding vehicle condition for performing the program and contents of a transaction corresponding to the precondition;
   a program administrating section that searches a program from the program database:
   a program registration checking section which checks operation of the program, determines a precondition of the vehicle condition for performing the program, and registers the program in the program database; and
   a demand processing section that receives the download for the program from the in-vehicle unit, requests the program administrating section to search the program based on the download demand, reads out the searched program and the attribute data related to the program from the program database, and sends the searched program along with the attribute data related to the program to the in-vehicle unit.

* * * * *